(12) United States Patent
Gardner

(10) Patent No.: US 9,389,031 B2
(45) Date of Patent: Jul. 12, 2016

(54) REMOVABLE PIN WITH INSERTION APERTURE

(71) Applicant: Edward J. Gardner, Midlothian, TX (US)

(72) Inventor: Edward J. Gardner, Midlothian, TX (US)

(73) Assignee: Dauntless Technologies, Inc., Milford, TX (US)

( * ) Notice: Subject to any disclaimer, the term of this patent is extended or adjusted under 35 U.S.C. 154(b) by 0 days.

(21) Appl. No.: 14/517,839

(22) Filed: Oct. 18, 2014

(65) Prior Publication Data

US 2016/0109198 A1    Apr. 21, 2016

Related U.S. Application Data

(63) Continuation-in-part of application No. 29/506,340, filed on Oct. 15, 2014.

(51) Int. Cl.
| | | |
|---|---|---|
| *F41A 21/00* | (2006.01) | |
| *F16B 21/00* | (2006.01) | |
| *F41A 3/66* | (2006.01) | |

(52) U.S. Cl.
CPC ........................................ *F41A 3/66* (2013.01)

(58) Field of Classification Search
CPC ........... F41A 3/66; F41A 21/00; F16B 21/00; F16B 21/12; F16B 21/16; F16B 2021/14
USPC ......... 411/347, 351, 352, 356, 555; 42/75.01, 42/75.02, 75.03, 75.04, 95, 106, 108
See application file for complete search history.

(56) References Cited

U.S. PATENT DOCUMENTS

| | | | | | |
|---|---|---|---|---|---|
| 923,767 | A | * | 6/1909 | Buckius | ................. F16G 15/06 278/96 |
| 2,858,725 | A | * | 11/1958 | Thompson | ............... B60D 1/02 411/356 |
| 4,358,987 | A | * | 11/1982 | Wilhelm | ................. F41A 11/00 42/75.02 |
| 4,416,186 | A | * | 11/1983 | Sullivan | .................... F41A 3/26 89/198 |
| 4,645,373 | A | * | 2/1987 | Purdy | ..................... F16B 7/042 24/644 |
| 7,147,420 | B2 | * | 12/2006 | Baus | ..................... F16B 21/125 411/347 |
| 7,937,876 | B1 | * | 5/2011 | Graham | .................. F41A 11/00 42/75.01 |

(Continued)

OTHER PUBLICATIONS

Battle Arms Development, Inc., "BAD-EPS (Enhanced Pins Set)-AR15", website description of product appearing at <http://shop.battlearmsdevelopment.com/BAD-EPS-Enhanced-Pins-Set-AR15-BAD-EPS.htm>, published at least as early as Sep. 16, 2014.

(Continued)

*Primary Examiner* — Roberta Delisle
(74) *Attorney, Agent, or Firm* — Braxton, Hilton & Perrone, PLLC

(57) ABSTRACT

A removable pin for securing two or more structures together, the pin including an insertion aperture for aiding in assembling the pin into at least one of said two or more structures. The insertion aperture is formed to receive and allow the passage of mechanical components that are necessary for proper functioning of the pin or overall mechanical device associated with the pin. A tool sized for insertion into the insertion aperture may be utilized to insert the mechanical components through the insertion aperture. The tool may also be utilized to manipulate the pin such that further assembly is possible.

11 Claims, 8 Drawing Sheets

(56) References Cited

U.S. PATENT DOCUMENTS

| | | | | |
|---|---|---|---|---|
| 8,397,623 | B2* | 3/2013 | Herring | F14A 3/26 42/16 |
| 8,453,364 | B2* | 6/2013 | Kucynko | F41C 23/16 42/71.01 |
| 8,528,246 | B2* | 9/2013 | Telles | F41C 23/16 42/71.01 |
| 8,689,478 | B2* | 4/2014 | Patel | F41A 3/66 42/75.02 |
| 9,151,555 | B1* | 10/2015 | Huang | F41A 11/00 |
| 2008/0190006 | A1* | 8/2008 | Jenkins | B25B 27/04 42/90 |

OTHER PUBLICATIONS

AR15.com, "How to Install the front Pivot Pin using a $1 clevis pin", post on public website forum appearing at <http://www.ar15.com/forums/t_3_4/362116_How-to_install_the_front_Pivot_Pin_using_a_1_clevis_pin_56K_death.html>, published Feb. 5, 2008.

Battle Arms Development, Inc., "AR-15—Battle Arms Development EPP/ETP—Enhanced Pins Installation/Overview", video appearing at <https://www.youtube.com/watch?v=vcAqNDwT34w>, published on Sep. 17, 2013.

* cited by examiner

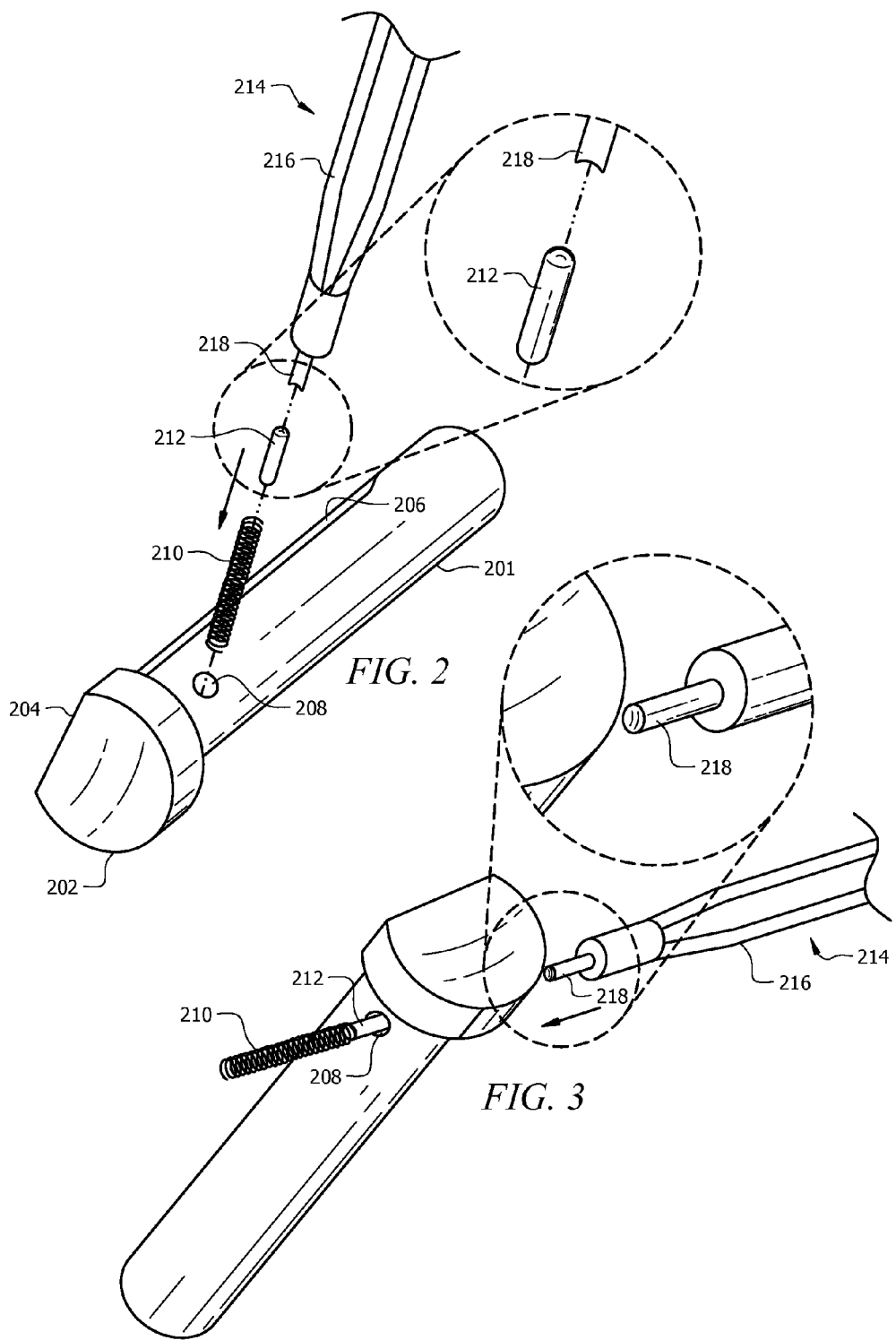

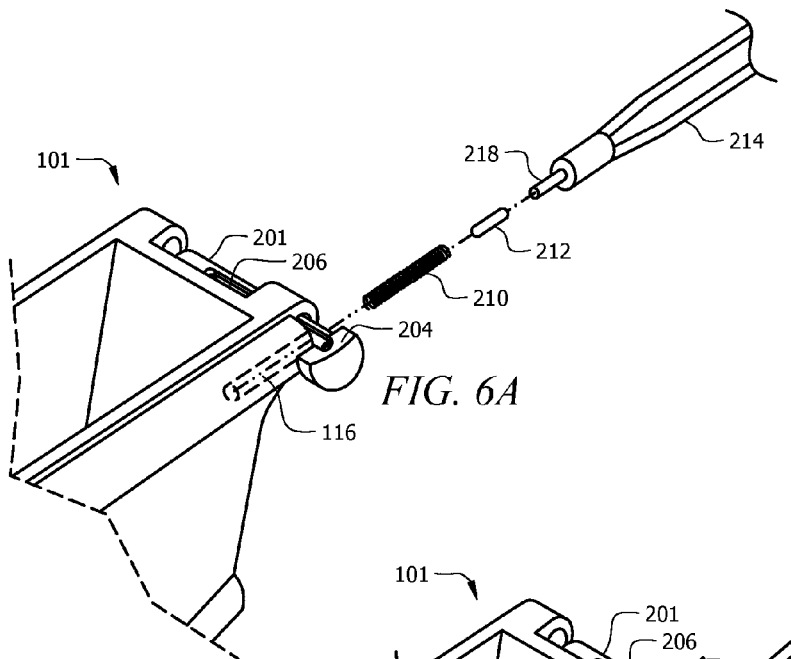
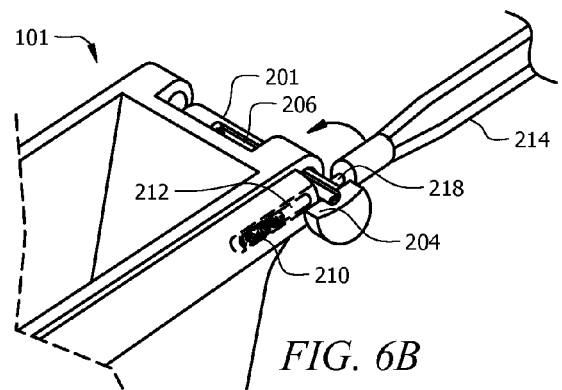
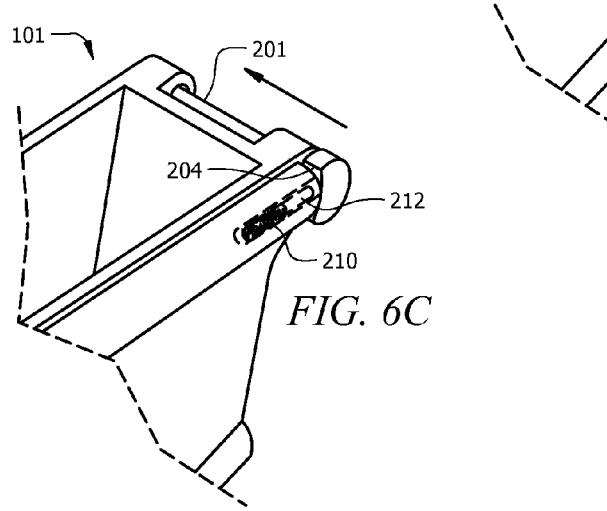

REMOVABLE PIN WITH INSERTION APERTURE

BACKGROUND OF THE INVENTION

1. Technical Field

The present invention relates generally to mechanical pin components and more specifically, to a pin having a transverse insertion aperture for use in assembling a firearm.

2. Description of Related Art

Aficionados of certain types of firearms have in recent years preferred to purchase various firearm components from manufacturers, distributors and/or retailers, and assemble said components themselves, rather than purchase a completely assembled firearm. This "do-it-yourself" ("DIY") method of assembling a firearm allows a firearms user to be selective in choosing the source of particular firearm components for incorporation into the user's firearm. In many instances, the firearm user's motivation for building a firearm in a DIY manner is so that one or more firearm components may be selected from what the user perceives to be a preferred manufacturing source. Another motivation for such a DIY manner of building a firearm is to reduce the overall expense of purchasing a firearm. Many firearm users that are more mechanically inclined prefer to assemble their own firearms simply because they derive enjoyment from the assembly process itself.

AR-15/M16/M4 style rifles (and variants thereof) are frequently selected by firearms users for such DIY assembly as the components of such rifles are supplied by numerous different manufacturers, providing for significant variety in sourcing options. However, assembling these pieces, or removing pieces for repair is often difficult, time consuming, and possibly dangerous. Consequently, there is a need for a more suitable system and method for replacing or assembling certain parts. Specifically, there is a need for a system or method for installing a pivot pin found on many rifles and other firearms.

BRIEF DESCRIPTION OF THE SEVERAL VIEWS OF THE DRAWINGS

The novel features believed characteristic of the inventions are set forth in the appended claims. The inventions themselves, however, as well as preferred modes of use, further advantages thereof, will be best understood by reference to the following detailed description of illustrative embodiments when read in conjunction with the accompanying drawings, wherein:

FIG. 2 is a perspective view of an embodiment of a removable pin with transverse insertion aperture and further illustrating how various firearm components are inserted within such pin;

FIG. 3 is a perspective view of an embodiment of the pin with transverse insertion aperture as shown in FIG. 2, and further illustrating how various firearm components are inserted within such pin;

FIG. 6A is a partial exploded view of the embodiment of the pin with transverse insertion aperture and associated firearm components as shown in FIG. 4 and FIG. 5, and further illustrating a step in a method of using an insertion tool to insert said components through said pin and into a firearm lower receiver assembly;

FIG. 6B is a perspective view of the embodiment of the pin with transverse insertion aperture and associated firearm components as shown in FIG. 6A, and further illustrating a step in a method of using an insertion tool to insert said components through said pin and into a firearm lower receiver assembly;

FIG. 6C is a perspective view of the embodiment of the pin with transverse insertion aperture and associated firearm components as shown in FIG. 6A and FIG. 6B, and further illustrating a step in a method of using an insertion tool to insert said components through said pin and into a firearm lower receiver assembly;

Figure 1:
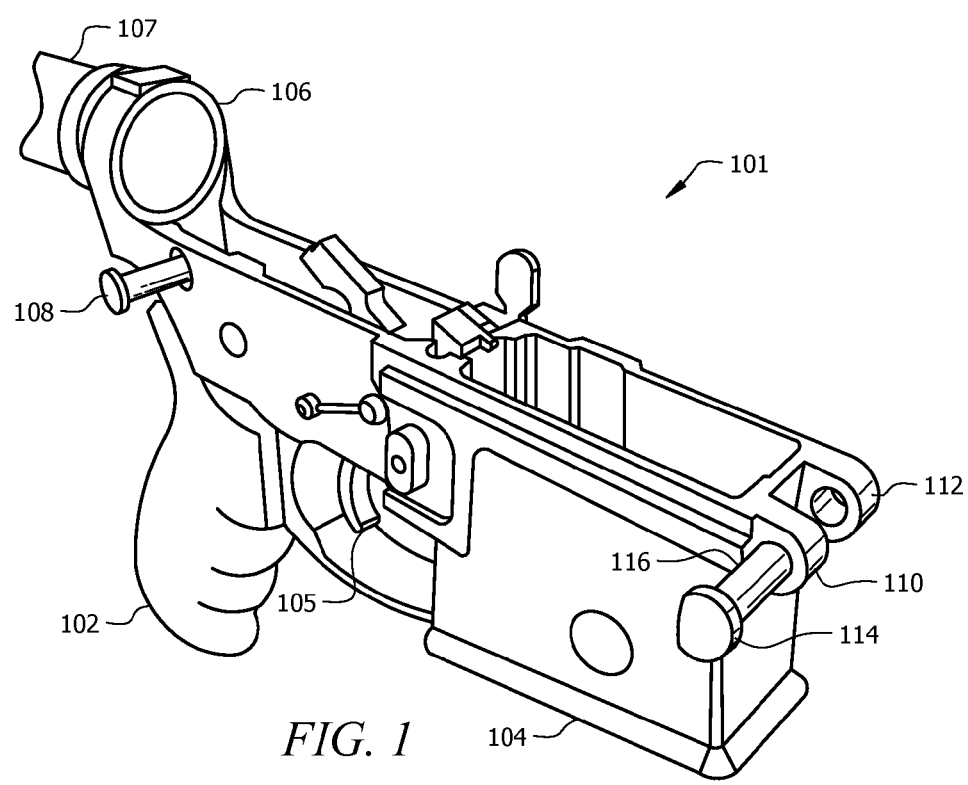
FIG. 1 is a perspective view of a AR-15 type firearm lower receiver assembly.

Where used in the various figures of the drawings, the same reference numerals designate the same or similar parts. All figures are drawn for ease of explanation of the basic teachings of the invention only; the extensions of the figures with respect to number, position, relationship, and dimensions of the parts to form the preferred embodiment will either be explained or will be within the skill of persons of ordinary skill in the art after the following teachings of the present invention have been read and understood.

DETAILED DESCRIPTION OF THE DRAWINGS

Several embodiments of Applicant's invention(s) will now be described with reference to the drawings. Unless otherwise noted, like elements will be identified by identical numbers throughout all figures. The invention(s) illustratively disclosed herein suitably may be practiced in the absence of any element that is not specifically disclosed herein.

Systems and methods for utilizing a removable pivot pin having a transverse insertion aperture are disclosed herein. It should be noted that while the exemplary embodiments of pins and other components discussed herein are associated with firearms, the systems and methods taught herein could also be equally utilized in connection with other types of non-firearm mechanical devices/machinery requiring the use of pins or other fastener components. Moreover, it should further be noted that while reference is made to "pins" for the purpose of describing the embodiments discussed herein, it should be noted that the systems and methods taught herein may also be equally applied to mechanical components not typically considered a "pin" but performing the same or similar functions. As used herein, the term "pin" may be construed to include mechanical components of the type typically considered to constitute pins, as well as other mechanical components not necessarily considered to be "pins," but generally having pin-like structures such as a body (cylindrical or non-cylindrical) having a length bounded to by two ends, and performing a function to fasten, secure, join, and/or attach other mechanical structures.

Referring to FIG. 1, a perspective view of an AR-15 style firearm lower receiver assembly (101). The lower receiver assembly comprises, amongst other components, a grip (102), ammunition magazine well (104), trigger (105), rear opening (106) for receiving a buffer tube assembly (107), takedown pin (108), forward support apertures (110, 112) and pivot pin (114). The lower receiver assembly is constructed to include an internal chamber (116) for receiving a pivot pin spring (not shown) and pivot pin detent (not shown), both of which are used to control lateral and rotational movement of the pivot pin when the firearm is fully assembled and the pivot pin is secured between the two forward support aperture structures (110, 112). More specifically, the pivot pin spring and pivot pin detent work to both temporarily arrest lateral and rotational movement of the pivot pin, and also prevent the inadvertent removal of the pivot pin from the lower receiver assembly without the use of tools. When fully assembled with an AR-15 upper receiver assembly (not shown), the pivot pin (114) serves to secure a forward lug protrusion (not shown) of the upper receiver assembly, to the lower receiver assembly (101).

In many cases, a firearm user assembling an AR-15 style rifle has little to no formal training as a gunsmith and typically does not possess a wide variety of gunsmithing tools. As a result, there are certain steps of the AR-15 style firearm assembly process that are more difficult to successfully complete. One step in the AR-15 firearm assembly process that has proven to be especially difficult for DIY assemblers is the installation of the pivot pin (and associated pivot pin detent/spring) within a lower receiver assembly.

In order to assemble the pivot pin into the lower receiver assembly (101), and more specifically, into the forward support apertures (110, 112), the pivot pin spring must first be inserted into the internal chamber (116), which has an opening (not shown) adjacent to the right forward support aperture (110). Next, the pivot pin detent must also be inserted into the internal chamber (116) such that said pivot pin detent depresses the pivot pin spring. In its undepressed state, the pivot pin spring applies such a significant force to the pivot pin detent that the entire pivot pin detent protrudes from the opening to the internal chamber and is visible to the user. If not depressed, the pivot pin detent would obstruct the insertion of the pivot pin into the forward support apertures. Accordingly, in order to assemble the pivot pin within the lower receiver assembly, a user must simultaneously depress the pivot pin detent into the internal chamber (opposing the force of the pivot pin spring) while sliding the pivot pin laterally into the forward support apertures. Due to the significant force that the pivot pin spring exerts on the pivot pin detent, the process of assembling the pivot pin into the lower receiver assembly is very difficult for many assemblers and often results in lost pivot pin detents and pivot pin springs if the small components are not moved precisely into position.

Referring now to FIG. 2, a perspective view of an embodiment of the pivot pin (201) with transverse insertion aperture (208), and further illustrating how various firearm components are inserted within such pivot pin prior to assembly into a larger mechanical device such as an AR-15 style lower receiver assembly. While the exemplary embodiment of the pin described herein has a substantially cylindrical body having a head (202) formed on one end, it is contemplated that alternate embodiments of the pin may take other shapes that are not substantially cylindrical. Likewise, the removable pin may be constructed of any number of types of sufficiently rigid and durable materials known to those of skill in the art such as, for example, steel having a parkerized finish. In other alternate embodiments, the pin may be constructed of other materials such as metals, plastics and alloys having properties that are sufficiently rigid and durable to handle the force and weight requirements necessary for the particular application for which they are used.

The head (202) of the pin is generally semi-circular in shape, having a flat portion that is formed to abut a surface of a lower receiver assembly having an opening leading to an internal chamber (formed to receive a pivot pin spring and pivot pin detent). However, alternate embodiments may be formed in such a manner so as to not include a head, or may include a head that is shaped differently than that which is depicted in connection with the embodiments of the pin discussed herein. Extending away from the pivot pin head, the body extends a length which, when the pivot pin is used in conjunction with an AR-15 style lower receiver assembly, is sized such that its length is approximately the same as the width of said lower receiver at the location where the pivot pin is positioned when assembled. A channel (206) is formed along one side of the pivot pin and runs along at least a portion of the length of said pivot pin, preferably said channel starting adjacent to the head (202) of the pivot pin and terminating adjacent to a disassembly aperture (not shown) formed into said channel and through the body of said pivot pin.

As discussed in further detail below, the disassembly aperture aids a user in depressing, with the use of a tool, the pivot pin detent so that the pivot pin can be removed from the forward support apertures. The distance between the termination of the channel and the end of the pivot pin opposite the head (hereinafter, "the distal end of the pivot pin), is sized such that when the pivot pin is assembled into the lower receiver assembly but moved into a position wherein the pivot pin detent is pushed into the disassembly aperture (having moved down the length of the channel), no portion of the distal end of the pivot pin protrudes from the inner surface of the proximal forward support aperture (see FIG. 1 at 110). As a result of the pivot pin not protruding from the inner surface of the proximal forward support aperture, an upper receiver assembly may be attached or dis-attached from the lower receiver assembly without the pivot pin obstructing such movement.

Still referring to FIG. 2, an insertion aperture (208) is formed through the pivot pin body at a location adjacent to the pivot pin head and in an axis direction that is substantially transverse (crossways, perpendicular or at a right angle) to an axis of the channel. Likewise, the insertion aperture is formed in a direction that is substantially transverse to the axis of the disassembly aperture. It should be note that while the preferred location and direction of the insertion aperture relative to the channel and disassembly aperture are described herein as transverse, it is further contemplated that alternate embodiments of the insertion pin may be formed at other locations along the pin, and may be formed in directions other than transverse to the channel/disassembly aperture. It should be noted however, that the insertion aperture (208) is preferably not formed on a side of the pin in which the channel is formed.

Still referring to FIG. 2, the diameter of the insertion aperture (208) is sized to allow it to receive and allow the passage of a pivot pin spring (210) and pivot pin detent (212). An insertion tool (214) having at least a handle (216) portion and a punch (218) portion, assists a user in inserting a pivot pin spring and detent through the insertion aperture, and into an opening to an internal chamber formed in a lower receiver assembly to receive such components (spring and detent). More specifically, a user may feed a pivot pin spring and pivot pin detent into the insertion aperture via a first opening and use the tip of the punch portion (218) to push the spring/detent into the internal chamber of the lower receiver assembly. The punch portion (218) of the insertion tool (214) is preferably substantially cylindrical, having a diameter approximately equal to the diameter of the pivot pin detent (212). An insertion tool having a punch portion that is approximately the same diameter as the pivot pin detent, provides an additional advantage not seen in the prior art in that such feature results in the user being able to more securely engage the pivot pin detent, thus giving a user more control over the movement of the pivot pin detent when a spring is exerting force on said pivot pin detent (as will occur during the assembly process).

The tip of the punch portion (218) of the insertion tool (214) is preferably substantially concave in shape so that it may more securely engage the rounded/convex tip of the pivot pin detent (212). An insertion tool having a tip that is shaped so as to engage a correspondingly shaped pivot pin detent is preferred because such a configuration provides for increased control of the pivot pin detent when a spring is exerting force on said pivot pin detent (as will occur during the assembly process). While the tip of the punch portion (218) of the insertion tool (214) is concave in the embodiments discussed herein, it is contemplated that alternate embodiments of the insertion tool may include tips formed in other shapes that will enable such tips to better engage correspondingly shaped pivot pin detents or other components that are configured for insertion (or removal) into a pin having an insertion aperture.

Referring now to FIG. 3, a perspective view of an embodiment of the pivot pin (201) with transverse insertion aperture as shown in FIG. 2, and further illustrating how various firearm components (pivot pin spring and pivot pin detent) are inserted within such pivot pin. The pivot pin spring (210) and pivot pin detent (212) pass through the insertion aperture (208) and exit an opening a second opening in said insertion aperture.

Figure 4:
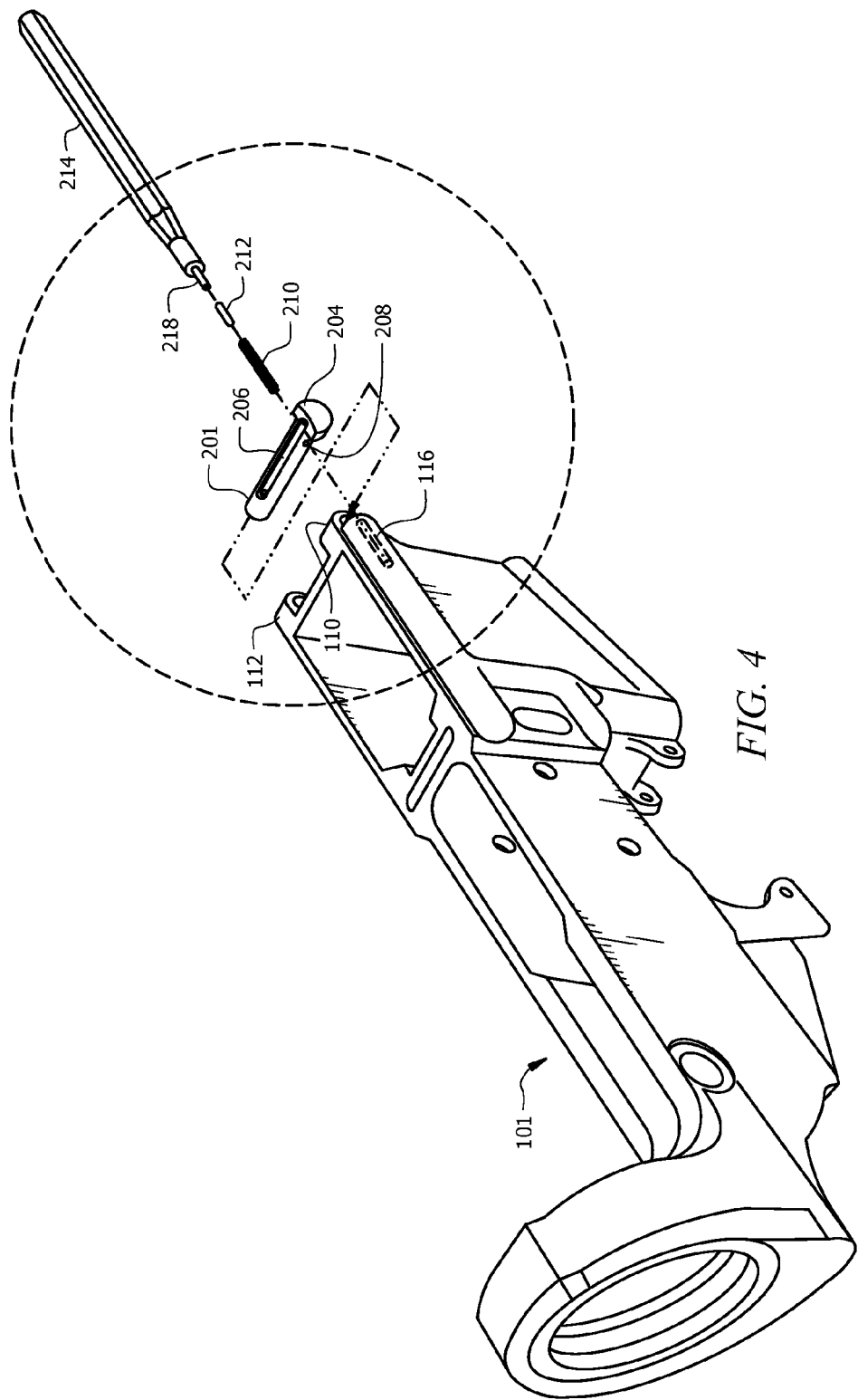
FIG. 4 is an exploded view of an embodiment of the pin with transverse insertion aperture and associated firearm components, and illustrating the use of an insertion tool to insert said components through said pin and into a firearm lower receiver assembly.
Figure 5:
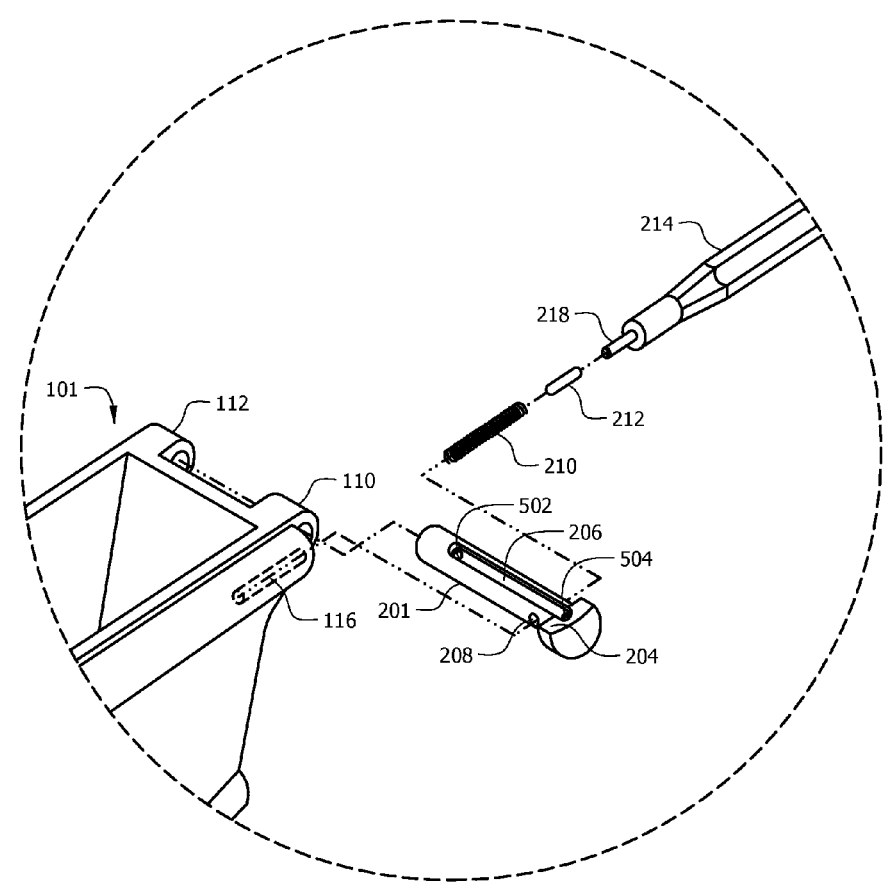
FIG. 5 is an exploded view of the embodiment of the pin with transverse insertion aperture and associated firearm components as shown in FIG. 4, and further illustrating the use of an insertion tool to insert said components through said pin and into a firearm lower receiver assembly.

Referring now to FIG. 4 and FIG. 5, partially exploded views of an embodiment of the pin (201) with transverse insertion aperture (208) and associated firearm components (pivot pin spring (210) and detent (212)), and illustrating the use of an insertion tool to insert said components through said pin and into a firearm lower receiver assembly (101). Prior to assembly, the pivot pin (201) is positioned such that the flat portion of the head is directed upwards such that the axis of the insertion aperture (208) will be aligned with the axis of the internal chamber (116) formed into the lower receiver assembly (101) to receive said pivot pin spring and detent. The length of the internal chamber is sized such that when the pivot pin and detent are inserted, the pivot pin spring will push the pivot pin detent entirely from the opening to the chamber. The distal end of the pivot pin is shaped/sized to be received by correspondingly shaped right forward support aperture (110) and left forward support aperture (112).

When the pivot pin is assembled into the lower receiver assembly, the detent is configured to engage the pivot pin along the length of the channel (206). The disassembly aperture (502) and an indentation (504) formed on the opposite end of the channel, serve to act as stops in which the detent may engage and thereby arrest lateral and rotational movement of the pivot pin within the forward support apertures (110, 112). The insertion aperture (208) works as a passage through which the pivot pin spring and detent may transit to be inserted into the internal chamber (116). The punch (218) portion of the insertion tool (214) aids in further depressing the pivot pin detent and spring so that assembly of the pivot pin may be accomplished without the use of further tools. It should be noted that in alternate embodiments, the insertion tool may be constructed of any of various types of materials such as metals, hardened plastics and alloys having properties that are sufficiently rigid and durable to handle the forces and weight requirements necessary for the particular application for which they are used.

Referring now to FIG. 6A, a partial exploded view of the embodiment of the pin (201) with transverse insertion aperture and associated firearm components (spring and detent) as shown in FIG. 4 and FIG. 5, and further illustrating a step in a method of using an insertion tool (214) to insert said components through said pin and into the internal chamber (116) formed into the firearm lower receiver assembly (101). The flat portion (204) of the pin head is directed upwards when the pin is readied for assembly into the lower receiver assembly. As previously depicted in FIG. 4 and FIG. 5, the pivot pin spring (210) is first positioned for insertion into the insertion aperture, to be followed by the pivot pin detent (212).

Referring now to FIG. 6B, a partial exploded view of the embodiment of the pin (201) with transverse insertion aperture and associated firearm components (spring and detent) as shown in FIG. 6A. The tip of the punch (218) portion of the insertion tool (214) is used to depress the pivot pin detent (212) into the pivot pin spring (210). The detent is depressed the entire length of the punch and until the neck of the insertion tool abuts the outer surface of the pivot pin (201). The length of the punch portion (218) of the insertion tool (214) should be preferably be sized such that it is long enough to push the detent all the way into the internal chamber (such that it does not protrude from chamber opening) but the length must not be so long as to allow the tip (218) to enter the chamber more than a negligible amount (if the insertion tool cannot rotate about the axis of the pivot pin when the punch is inserted into the insertion aperture, the length of the punch portion is too long). After the insertion tool has been used to depress the pivot pin detent (212) into the internal chamber, the insertion tool may be rotated about the length-wise axis of the pivot pin in the direction of the rear of the lower receiver assembly, until a point at which the pivot pin detent engages the channel (206) formed on a side of the pivot pin.

Referring now to FIG. 6C, a perspective view (showing inside of internal chamber) of the embodiment of the pin (201) with transverse insertion aperture and associated firearm components (spring and detent) as shown in FIG. 6A. When the detent is engaged within the channel of the pivot pin (201), the pivot pin may move laterally back and forth within the forward support apertures. However, while the detent is engaged within the channel of the pivot pin, rotational movement of the pivot pin is prevented. The lateral movement of the pivot pin may be at least temporarily arrested if the pin is moved as far in a leftward direction such that the head of the pin abuts the right forward support aperture (110). In this position, the pivot pin detent (212) engages the indentation (504) formed in the channel and prevents further lateral movement of the pin until a sufficient opposing lateral force is applied to the pin displace the detent from the indentation (such as may occur should the user desire to dis-attach the upper receiver from the lower receiver assembly of the firearm).

Figure 6D:
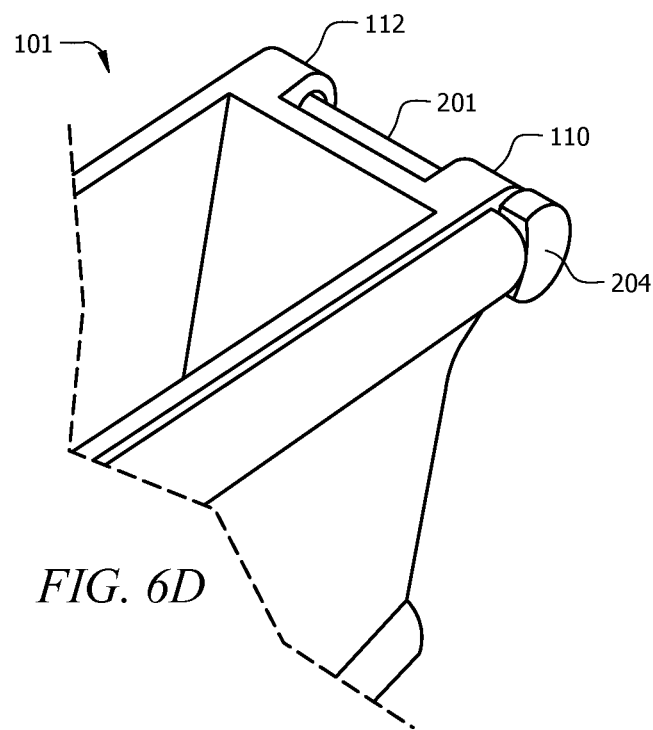
FIG. 6D is a perspective view of the embodiment of the pin with transverse insertion aperture as shown in FIG. 6A, FIG. 6B and FIG. 6C, illustrating the position of said pin into a firearm lower receiver assembly when assembled.

Now referring to FIG. 6D, a perspective view of the embodiment of the pin with transverse insertion aperture as shown in FIG. 6A, FIG. 6B and FIG. 6C, illustrating the position of said pin as it is mounted to a firearm lower receiver assembly when fully assembled. It should be noted that after rotation of the pivot pin, the flat portion of the head abuts the surface of the lower receiver assembly adjacent to the opening leading to the internal chamber.

Figure 6E:
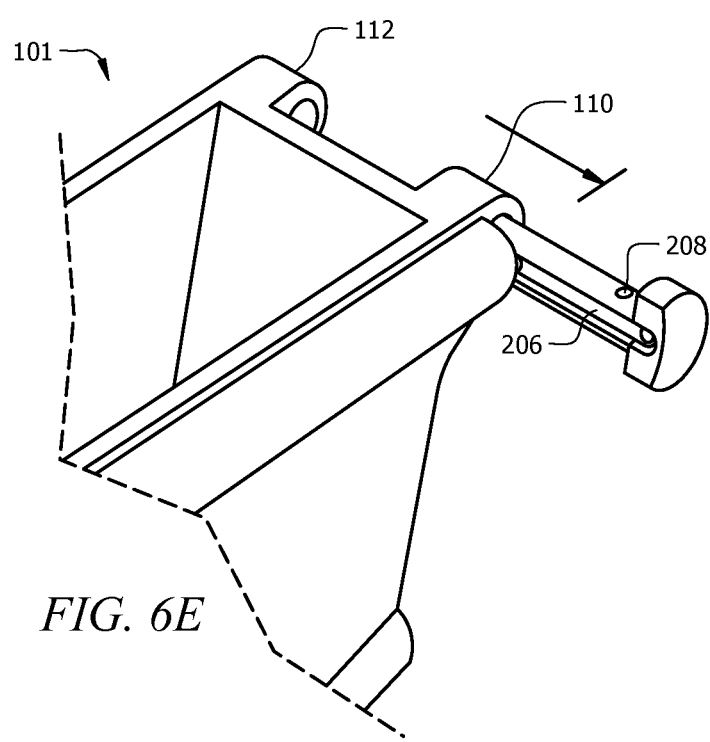
FIG. 6E is a perspective view of the embodiment of the pin with transverse insertion aperture as shown in FIG. 6D, illustrating how said pin may be moved laterally within the forward support apertures of a firearm lower receiver assembly when assembled.

Referring now to FIG. 6E, a perspective view of the embodiment of the pin with transverse insertion aperture as shown in FIG. 6D, illustrating how said pin may be moved within the forward support apertures of a firearm lower receiver assembly when assembled. When the pivot pin is moved to a far right position relative to the forward support apertures (110, 112), the disassembly aperture (not shown) formed in the channel (206) works to prevent further rightward movement of the pivot pin (in the direction of the straight arrow appearing in FIG. 6E). Those skilled in the art will appreciate that a disassembly tool may be utilized to disassemble the pivot pin from the lower receiver assembly. More specifically, when the pivot pin is moved to a far rightward position (in the direction of the straight arrow appearing in FIG. 6E) such that the disassembly aperture is aligned with the axis of the internal chamber, a punch on a disassembly tool (not shown) may be inserted into the disassembly aperture until the detent is fully depressed into the internal chamber. Once the detent is fully depressed, the disassembly tool may be rotated about the axis of the pivot pin until the detent is no longer engaged inside the channel. This disengagement of the detent from the channel allows the pivot pin to be removed from the right forward support aperture (110).

Figure 7A:
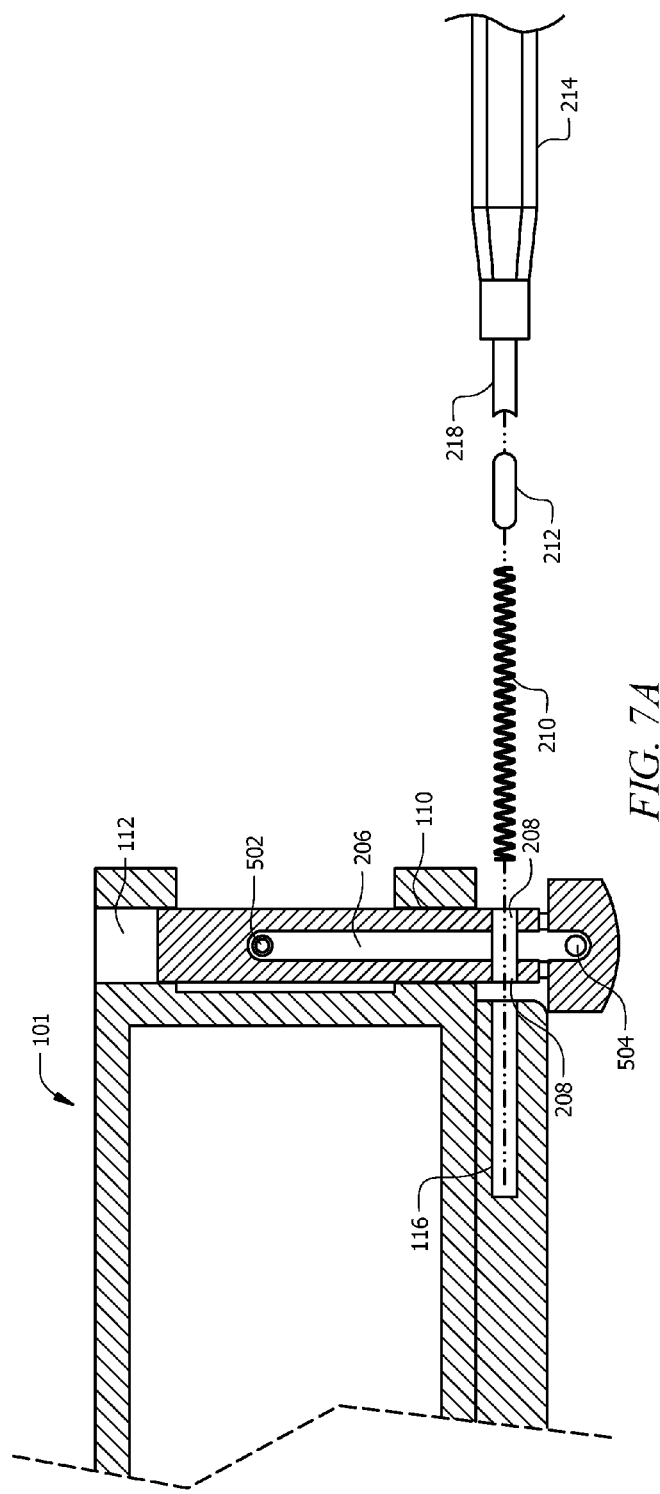
FIG. 7A is a cross-sectional view of an embodiment of the pin with transverse insertion aperture inserted into a firearm lower receiver assembly, and illustrating the manner in which associated firearms components are inserted through said pin and into a firearm lower receiver assembly.

Referring now to FIG. 7A, a cross-sectional view of an embodiment of the pin (201) with transverse insertion aperture (208) inserted into a firearm lower receiver assembly (101), and illustrating the manner in which associated firearms components (pivot pin spring (210) and pivot pin detent (212)) are inserted through said pin and into an internal chamber (116) formed within said firearm lower receiver assembly. As previously depicted in FIG. 4 and FIG. 5, the pivot pin spring (210) is first positioned for insertion into the insertion aperture, to be followed by the pivot pin detent (212).

Figure 7B:
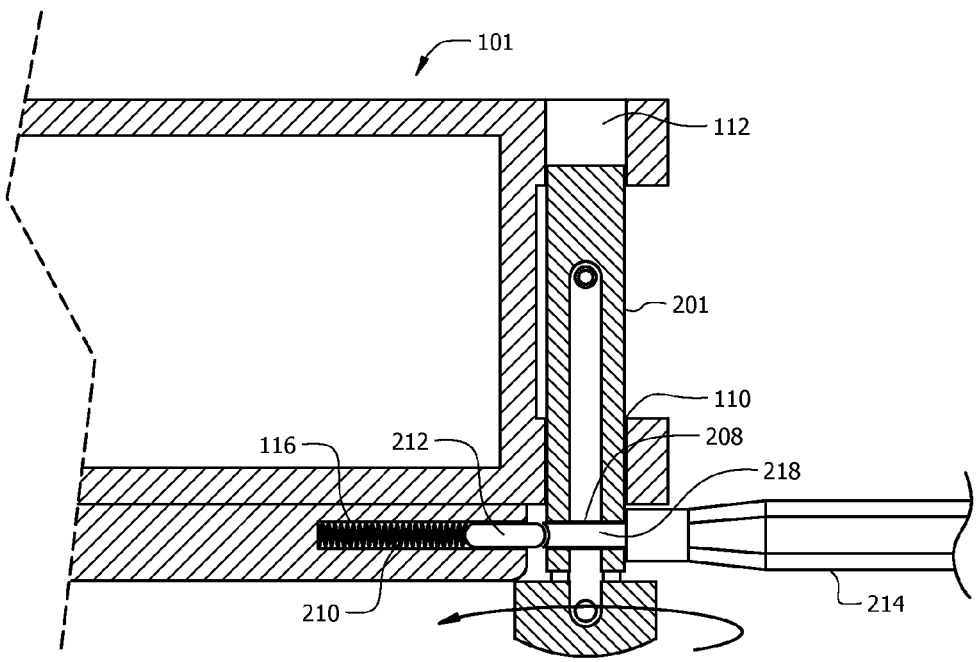
FIG. 7B is a cross-sectional view of an embodiment of the pin with transverse insertion aperture inserted into a firearm lower receiver assembly, and further illustrating a step in a method of using a tool to insert associated firearm components through said pin and into said firearm lower receiver assembly.

Referring now to FIG. 7B, a cross-sectional view of an embodiment of the pin (201) with transverse insertion aperture (208) inserted into a firearm lower receiver assembly (101), and illustrating the manner in which associated firearms components (pivot pin spring (210) and pivot pin detent (212)) are inserted through said pin and into an internal chamber (116) formed within said firearm lower receiver assembly. The tip of the punch (218) portion of the insertion tool (214) is used to depress the pivot pin detent (212) into the pivot pin spring (210). The detent is depressed the entire length of the punch and until the neck of the insertion tool abuts the outer surface of the pivot pin (201). After the insertion tool has been used to depress the detent (212) into the internal chamber (116), the insertion tool may be rotated about the length-wise axis of the pivot pin in the direction of the rear of the lower receiver assembly, until a point at which the detent engages the channel (206) formed on a side of the pivot pin.

Figure 7C:
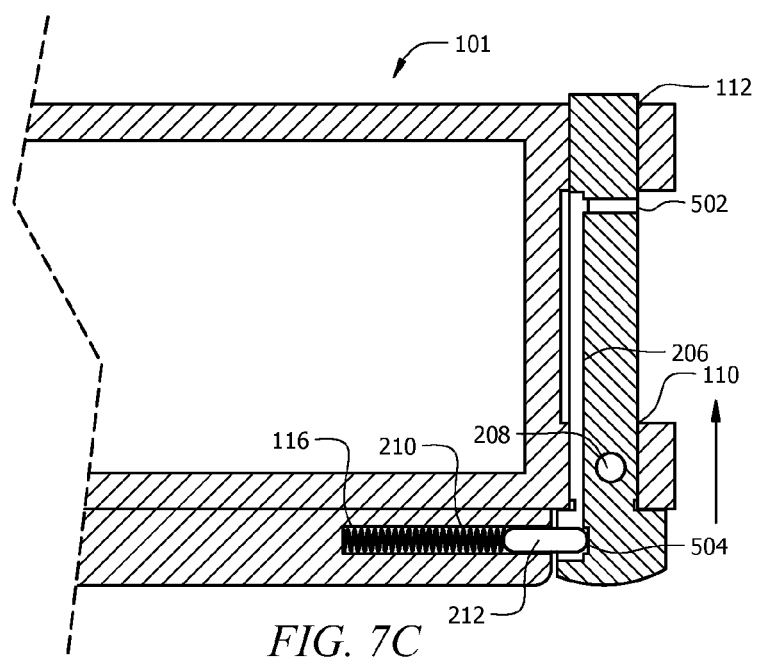
FIG. 7C is a cross-sectional view of an embodiment of the pin with transverse insertion aperture fully assembled within a firearm lower receiver assembly.

Referring now to FIG. 7C, a cross-sectional view of an embodiment of the pin (201) with transverse insertion aperture (208) and illustrating the position of said pin engaged within a firearm lower receiver assembly when fully assembled. When the pivot pin detent is engaged within the channel of the pivot pin (201) (but the detent is not yet engaged with the indentation (504)), the pivot pin may move laterally back and forth within the forward support apertures. The movement of the pivot pin may be at least temporarily arrested if the pin is moved in a leftward direction (direction of straight arrow appearing in FIG. 7C) such that the head of the pin abuts or is adjacent to the right forward support aperture (110). In this position, the pivot pin detent (212) engages the indentation (504) formed in the channel and prevents further lateral movement of the pin until a sufficient opposing lateral force is applied to the pin to displace the detent from the indentation (such as may occur should the user desire to dis-attach the upper receiver from the lower receiver assembly of the firearm).

The system and method discussed herein is superior to other prior systems and methods for assembling a pivot pin, each of which has drawbacks that make it unsuitable for many assemblers. One prior method for assembling a pivot pin into a lower receiver assembly of an AR-15 style firearm involves the use of a razor blade type knife in which a flat surface of a razor is used to depress the pivot pin detent while the user attempts to slide the pivot pin into place within the forward support apertures. One drawback of such a method is that by applying a force to the flat side of a razor in order to depress the pivot pin detent, there is an increased risk of the razor slipping, which is a safety hazard. There is also an increased risk that the lower receiver assembly or other components will be damaged by the razor blade. Another drawback of such a method of assembly is that there is a high chance that small components (such as the pivot pin detent and pivot pin spring) will be lost during the assembly process as such method requires a high degree of coordination to successfully achieve given the high outward forces being exerted by the pivot pin spring on the pivot pin detent.

The method and system discussed herein is comparatively much safer in that a razor is not utilized. Moreover, the method and system discussed herein provides additional advantages not provided in the prior art in that less user skill and coordination is required in order for a user to successfully assemble a pivot pin within a firearm lower receiver. Further, the likelihood of a user losing small components (such as the pivot pin detent and pivot pin spring) during the assembly process is substantially reduced when utilizing the systems and methods taught herein. An even further advantage provided by the systems and methods of assembly taught herein is that they only require the use of a single tool.

It should be noted that the description of the present invention has been presented for purposes of illustration and description, and is not intended to be exhaustive or limited to the invention in the form disclosed. Many modifications and variations will be apparent to those of ordinary skill in the art. The preferred embodiment appearing in the drawings was chosen and described in order to best explain the principles of the invention, the practical application, and to enable others of ordinary skill in the art to understand the invention for various embodiments with various modifications as are suited to the particular use contemplated. It will be understood by one of ordinary skill in the art that numerous variations will be possible to the disclosed embodiments without going outside the scope of the invention as disclosed in the claims. Moreover, it should be noted that uses of the phrase "the present invention" within this disclosure are not intended to limit or otherwise restrict the scope of the invention(s) disclosed and claimed by the inventor, but said phrase is merely intended to refer to certain examples of embodiments of the invention(s).

What is claimed is:

1. A pin comprising:
   (a) a body having a length;
   (b) a channel formed on a side of said body, said channel running along at least a portion of said length;
   (c) a first aperture formed through said body, said aperture not formed on a side of said body on which said channel is formed; and
   (d) a second aperture formed through said body, said second aperture having an opening into a distal end of said channel.

2. The pin of claim 1, wherein a first axis of said first aperture is formed on said body at a position that is substantially transverse to a second axis of said second aperture.

3. The pin of claim 1, further comprising a head formed on a first end of said body, wherein said first aperture is positioned adjacent to said head.

4. The pin of claim 1, further comprising an indentation formed on a proximal end of said channel.

5. The pin of claim 1, wherein said pin is a firearm pivot pin and said first aperture is substantially cylindrical and having a diameter sized to allow the insertion of a pivot pin spring and pivot pin detent therein.

6. A pin assembly system comprising:
   (a) a pin with a body having a length; a channel formed on a side of said body, said channel running along at least a portion of said length; a first aperture formed through said body, said aperture not formed on a side of said body on which said channel is formed; and
   (b) an insertion tool having one end sized to be inserted into said first aperture.

7. The pin assembly system of claim 6, wherein said one end of said tool is sized such that when said tool is inserted into said first aperture, a tip of said one end does not protrude out of said first aperture.

8. The pin assembly system of claim 7, wherein said tip of said one end of said tool is shaped to engage an end of a correspondingly shaped detent.

9. The pin assembly system of claim 8, wherein said one end of said tool has a first diameter that is substantially equal to or greater than a second diameter of said detent.

10. The pin assembly system of claim 6, further comprising a second aperture formed through said body, said second aperture having an opening into a distal end of said channel.

11. The pin assembly system of claim 6, wherein a first axis of said first aperture is formed on said body at a position that is substantially transverse to a second axis of said second aperture.

* * * * *